Patented June 6, 1939

2,160,946

UNITED STATES PATENT OFFICE 2,160,946

VINYLIDENE CHLORIDE CO-POLYMERS

Edgar C. Britton and Fred Lowell Taylor, Midland, Mich., assignors to The Dow Chemical Company, Midland, Mich., a corporation of Michigan No Drawing. Application July 25, 1938, Serial No. 221,167

7 Claims. (Cl. 260—80)

This invention relates to the product obtained by polymerizing together monomeric vinylidene chloride and the monomer of at least one unsaturated ester having the general formula

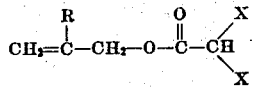

wherein R is hydrogen, methyl, or halogen, one X is halogen and the other X is hydrogen or the same halogen. The esters defined by the above formula are the allyl, 2-methylallyl, and 2-haloallyl esters of the halo- and di-halo-acetic acids. The invention relates particularly to the co-polymers of vinylidene chloride and the monomers of allyl, methylallyl, or 2-chloroallyl-chloroacetate.

We have found that a variety of useful synthetic resinous and plastic products may be prepared by the copolymerization of vinylidene chloride and one or more of the unsaturated esters of the halo-and di-halo-acetic acids having the general formula given above. Such products, herein referred to as co-polymers, may be prepared by heating together a mixture of the co-polymerizable compounds at temperatures from about room temperature up to about 100° C. Co-polymerization is facilitated by the use of catalysts capable of accelerating the reaction. Such catalysts include, for example, light, benzoyl peroxide, mixtures of uranium nitrate or acetate and benzoyl peroxide, and the like. When uranium salts are employed in the mixture, the polymerizable compounds are ordinarily subjected to the radiant energy from a mercury vapor lamp or to direct sunlight.

Our new co-polymeric products vary in their physical properties depending upon both the identity of the compounds being co-polymerized and the proportion of vinylidene chloride and the said co-polymerizable compounds. We have found that the co-polymers possessing the most utility are obtained when the vinylidene chloride constitutes at least 50 per cent of the monomeric mixture subjected to co-polymerization. When the finished co-polymer contains over about 40 per cent of the unsaturated ester, the said co-polymer is generally too soft and gelatinous for most purposes for which plastics are employed. These gelatinous products are, however, useful in the preparation of coating compositions and the like and are included in the scope of the present invention. When the co-polymer contains less than 40, and preferably less than about 25 per cent of the unsaturated esters, the properties vary from fairly soft plastics to relatively hard masses as the proportion of the said ester decreases. The co-polymers containing up to 25 per cent of the unsaturated esters are ordinarily most readily prepared. In all cases the softening point of the co-polymers is substantially lower than that of polymeric vinylidene chloride alone and in most cases the decomposition temperature of the co-polymer is not materially lower than that of polymeric vinylidene chloride. The co-polymers may be worked over a wider temperature range between the softening point and the decomposition point than can polymeric vinylidene chloride.

The herein-described co-polymers are somewhat soluble in dioxane at temperatures from room temperature up to its boiling point but are substantially completely insoluble in the benzene hydrocarbons and in most of the common organic solvents including acetone, ether, the alcohols, ethyl acetate, butyl acetate, etc. They are somewhat soluble or are readily swelled by ortho-dichlorobenzene, mono-chlorobenzene, or tri-chlorobenzene at temperatures above 130° C.

Most of our herein-described co-polymers are resistant to attack by concentrated sulphuric acid and other strong mineral acids. Some of the co-polymers discolor slightly after contact with concentrated sulphuric acid but do not appear to be decomposed thereby to any appreciable extent. It may be said, in general, that the co-polymers defined by the appended claims are quite resistant to the action of most common acids and alkalies and of most of the common organic solvents including the alcohols, hydrocarbons, chlorinated hydrocarbons, ketones, etc., at temperatures below 100° C., with the exceptions noted above.

The co-polymer which we have found to possess the most desirable properties is the co-polymer of vinylidene chloride and 2-chloroallyl-chloroacetate. The chloroallyl-chloroacetate, when mixed with monomeric vinylidene chloride and co-polymerized therewith, does not retard the polymerization of the vinylidene chloride to the same extent as do similar proportions of most other co-polymerizable compounds. The harder co-polymers of vinylidene chloride and 2-chloroallyl-chloroacetate, i. e., those containing less than about 25 per cent of the said ester, can be cast into strong films from solutions of the said co-polymer in dioxane. When the said co-polymer is molded, it produces stronger articles than do most of the co-polymers of vinylidene chloride under like conditions. The co-polymer of vinylidene chloride and 2-chloroallyl-chloroacetate, even when unmodified by added plasticizers is capable of considerably more elongation without rupture than are most of the heretofore known co-polymers of vinylidene chloride. It is also more elastic, especially when plasticized, than other similarly plasticized vinylidene chloride co-polymers. For example, a molded sample of a vinylidene chloride co-polymer containing about 12 per cent of 2-chloroallyl-chloroacetate, when stretched 10 per cent and released, would return at once substantially to its original size and shape. Most other vinylidene chloride co-polymers return to their original size only when stretched about 2 to 4 per cent. The unplasticized co-polymer of vinylidene chloride containing about 12 per cent of 2-chloroallyl-chloroacetate is capable of about 100 per cent elongation after molding, while still relatively freshly prepared. Plasticized modifications of the same co-polymer exhibit elongations up to 250 per cent without rupture.

In the following table are set forth data showing the analysis of various of our new co-polymers produced from mixtures of monomeric vinylidene chloride and unsaturated esters defined by the general formula previously given. Co-polymerization was in each case carried out at 40° C. In the table, the unsaturated ester is referred to as a "modifier" from its effect in modifying the properties of the co-polymers as compared with those of polymeric vinylidene chloride. The proportion of reagents are given in per cent by weight and the amount of modifier entering into the co-polymeric product is calculated from the chlorine analysis of the co-polymers obtained.

*Table*

| Run No. | Modifier | Percent modifier | Percent vinylidene chloride | Polymerization time, hours | Extent of polymerization percent | Percent chlorine in co-polymer | Percent chlorine in modifier | Percent modifier in co-polymer | Percent vinylidene chloride in co-polymer |
|---|---|---|---|---|---|---|---|---|---|
| 1 | 2-chloroallyl-chloroacetate | 15 | 85 | 65 | 62.0 | 70.3 | 41.97 | 10.1 | 89.9 |
| 2 | ----do---- | 20 | 80 | 93 | 56.8 | 69.44 | 41.97 | 12.0 | 88.0 |
| 3 | ----do---- | 20 | 80 | 72 | 45.9 | 69.96 | 41.97 | 10.3 | 89.7 |
| 4 | ----do---- | 20 | 80 | 71 | 52.2 | 69.92 | 41.97 | 10.5 | 89.5 |
| 5 | ----do---- | 20 | 80 | 71 | 47.7 | 69.52 | 41.97 | 11.8 | 88.2 |
| 6 | 2-chloroallyl-dichloroacetate | 20 | 80 | 42 | 39.1 | 71.22 | 52.36 | 9.5 | 90.5 |
| 7 | ----do---- | 20 | 80 | 47 | 48.9 | 70.71 | 52.36 | 12.0 | 88.0 |
| 8 | Allyl-chloroacetate | 20 | 80 | 71 | 69.3 | 70.53 | 26.36 | 5.7 | 94.3 |
| 9 | 2-methylallyl-chloroacetate | 20 | 80 | 71 | 50.8 | 69.52 | 23.87 | 7.4 | 92.6 |

The examples have shown the preparation of co-polymers of vinylidene chloride and 2-chloroallyl-chloroacetate, 2-methylallyl-chloroacetate, allyl-chloroacetate, and 2-chloroallyl-dichloroacetate. The most important of these co-polymers, from the standpoint of its properties, appears at present to be that of vinylidene chloride and 2-chloroallyl-chloroacetate. The illustrative runs given in the table indicate that all of the compounds co-polymerized with vinylidene chloride quite readily but that the proportion of the unsaturated esters in the finished co-polymer is considerably lower than the proportion of that ester in the monomeric mixture subjected to co-polymerization. As has been stated previously our invention comprises the co-polymers of vinylidene chloride and the previously defined unsaturated esters, wherein at least 50 per cent of the co-polymer is vinylidene chloride. Our new co-polymers may be modified in their physical properties and general appearance and utility by incorporating therein various effect materials such as coloring agents, fillers, and plasticizers. Such materials may be added in any expedient manner before or after co-polymerization, depending upon the effect such materials may have on the polymerization rate of the monomers or on the property of the finished co-polymer.

Other modes of applying the principle of our invention may be employed instead of those explained, change being made as regards the materials or process employed, provided the ingredients stated by any of the following claims or the equivalent of such stated ingredients be employed.

We therefore particularly point out and distinctly claim as our invention:

1. A co-polymer of vinylidene chloride and other polymerizable compounds at least one of which is an unsaturated ester having the general formula

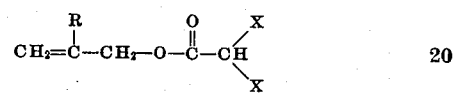

wherein R is a member of the class consisting of hydrogen, the methyl radical and halogen, one X is halogen and the other X is a member of the class consisting of hydrogen and the same halogen, at least 50 per cent of the weight of the co-polymer being vinylidene chloride.

2. A co-polymer of vinylidene chloride and an unsaturated ester having the general formula

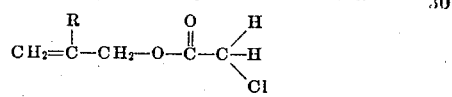

wherein R is a member of the class consisting of hydrogen, the methyl radical and halogen, at least 50 per cent of the weight of the co-polymer being vinylidene chloride.

3. A co-polymer of vinylidene chloride and an unsaturated ester having the general formula

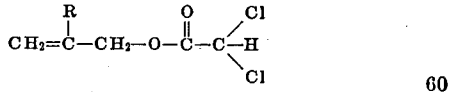

wherein R is a member of the class consisting of hydrogen, the methyl radical and halogen, at least 50 per cent of the weight of the co-polymer being vinylidene chloride.

4. A co-polymer of vinylidene chloride and 2-chloroallyl-chloroacetate wherein the amount of vinylidene chloride is at least 50 per cent of the weight of the co-polymer.

5. The process which comprises polymerizing a mixture of the monomers of vinylidene chloride and an unsaturated ester having the general formula

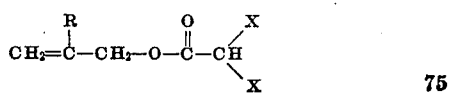

wherein R is a member of the class consisting of hydrogen, the methyl radical and halogen, one X is halogen and the other X is a member of the class consisting of hydrogen and the same halogen, to produce a co-polymer at least 50 per cent of which is co-polymerized vinylidene chloride.

6. The process which comprises polymerizing a mixture of the monomers of vinylidene chloride and 2-chloroallyl-chloroacetate to produce a co-polymer at least 50 per cent of which is co-polymerized vinylidene chloride.

7. A plastic composition comprising a co-polymer of vinylidene chloride and 2-chloroallyl-chloroacetate, the weight of vinylidene chloride being at least 50 per cent of the weight of said co-polymer.

EDGAR C. BRITTON.
FRED LOWELL TAYLOR.